United States Patent
Germano et al.

(10) Patent No.: US 6,805,361 B2
(45) Date of Patent: Oct. 19, 2004

(54) STABILIZER ARRANGEMENT FOR A MOTOR VEHICLE

(75) Inventors: Francesco Germano, Bietigheim-Bissingen (DE); Peter Mevissen, Renningen (DE)

(73) Assignee: Dr. Ing. h.c.F. Porsch Aktiengesellschaft, Stuttgart (DE)

( * ) Notice: Subject to any disclaimer, the term of this patent is extended or adjusted under 35 U.S.C. 154(b) by 147 days.

(21) Appl. No.: 10/300,004

(22) Filed: Nov. 20, 2002

(65) Prior Publication Data

US 2003/0122342 A1 Jul. 3, 2003

(30) Foreign Application Priority Data

Nov. 21, 2001 (DE) .......................... 101 57 085

(51) Int. Cl.⁷ .......................... B60G 21/055
(52) U.S. Cl. .................. 280/5.511; 280/5.508; 280/124.107; 192/71
(58) Field of Search .................. 280/5.511, 5.508, 280/124.107; 192/71, 107 C, 52.2; 267/188

(56) References Cited

U.S. PATENT DOCUMENTS

| | | | | |
|---|---|---|---|---|
| 1,984,978 A | * | 12/1934 | Moffitt | 280/6.158 |
| 3,423,099 A | * | 1/1969 | Mars | 280/124.107 |
| 4,648,620 A | * | 3/1987 | Nuss | 280/5.511 |
| 4,919,444 A | * | 4/1990 | Leiber et al. | 280/5.511 |
| 5,076,605 A | * | 12/1991 | Umeda | 280/124.107 |
| 5,203,438 A | * | 4/1993 | Ide | 192/107 C |
| 5,226,516 A | * | 7/1993 | Novikoff et al. | 192/70.28 |
| 5,251,926 A | | 10/1993 | Aulerich et al. | |
| 5,527,061 A | * | 6/1996 | Karl | 280/124.107 |
| 6,022,030 A | * | 2/2000 | Fehring | 280/5.511 |
| 6,149,166 A | * | 11/2000 | Struss et al. | 280/5.511 |
| 6,318,737 B1 | * | 11/2001 | Marechal et al. | 280/5.511 |
| 6,428,019 B1 | * | 8/2002 | Kincad et al. | 280/5.511 |
| 6,550,788 B2 | * | 4/2003 | Schmidt et al. | 280/5.511 |
| 6,651,991 B2 | * | 11/2003 | Carlstedt et al. | 280/5.511 |
| 6,698,767 B2 | * | 3/2004 | Hagan | 280/5.511 |
| 2004/0084857 A1 | * | 5/2004 | Vortmeyer et al. | 280/5.511 |

FOREIGN PATENT DOCUMENTS

| | | |
|---|---|---|
| DE | 19923100 C1 | 2/2001 |
| JP | 2000-289427 | * 10/2000 |
| JP | 2001-260625 | * 9/2001 |

* cited by examiner

Primary Examiner—Paul N. Dickson
Assistant Examiner—George D. Spisich
(74) Attorney, Agent, or Firm—Crowell & Moring LLP (57) ABSTRACT

A stabilizer arrangement for a motor vehicle has a torsion bar with two bar parts with first ends which can each be connected with a wheel suspension of a wheel axle having two wheels. The stabilizer arrangement, in addition, has a clutch with first and second clutch elements. The clutch form-lockingly connects or separates two second ends of the bar parts situated adjacent to one another. For a form-locking connection, each clutch element has at least two form closure elements. When the clutch is separated, each clutch element can be rotated relative to the other. The stabilizer arrangement also has an operating device for the separation of the clutch. In order to simplify the operating device of the clutch, the form closure elements of the first or second clutch element form engaging elements movably linked thereto. For a separation of the clutch, the engaging elements are movable independently of one another. The elements are displaceable independently of one another by the operating device.

22 Claims, 5 Drawing Sheets

STABILIZER ARRANGEMENT FOR A MOTOR VEHICLE

This application claims the priority of German application 101 57 085.6, filed Nov. 21, 2001, the disclosure of which is expressly incorporated by reference herein.

BACKGROUND AND SUMMARY OF THE INVENTION

The present invention relates to a stabilizer arrangement for a motor vehicle having a torsion bar with two bar parts, the bar parts including first ends which can each be connected with a wheel suspension of a wheel axle having two wheels. A clutch, with a first clutch element and a second clutch element, form-lockingly connects or separates two second ends of the bar parts situated adjacent to one another. Each of the clutch elements, for a form-locking connection, has at least two form closure elements and, when the clutch is separated, is rotatable relative to the other. An operating device is also provided for separation of the clutch.

A stabilizer arrangement of the above-mentioned type is known from German Patent Document DE 199 23 100 C1. This arrangement includes a two-part torsion bar with two bar parts which can be connected by way of their first ends with a wheel suspension of a wheel axle having two wheels. The second, mutually adjacent ends of the bar parts can be form-lockingly connected by way of a clutch for transmission of a torsional moment and separated when no torsional moment is to be transmitted. For this purpose, the clutch has first and second clutch elements, each of which, for the form-locking connection, has at least two rigid form-locking elements. When the clutch is separated, the two clutch elements can be rotated relative to one another, whereby the two bar parts of the torsion bar are uncoupled and thus reduce stabilization of the rolling motion of the vehicle. For operating the clutch device, the stabilizer arrangement also includes an operating device which separates the two clutch elements from one another. In the known stabilizer arrangement, the operating device includes a hydraulic cylinder which is connected by way of a valve arrangement with a flow medium pump or a tank for hydraulic fluid. The hydraulic cylinder operates one of the two clutch elements in the axial direction, whereby both form closure elements of this one clutch element are simultaneously pulled out of the form closure elements of the other clutch element. In this case, it is a disadvantage that, when the torsion bar is twisted, one form closure element of the one clutch element may be clamped in between the two other form closure elements of the other clutch element. In some cases, therefore, high operating forces have to be applied for separating the clutch. In addition, high technical expenditures are required for the operating device, for example, for hydraulic valves, hydraulic lines, the pump, etc. This results in a high weight and high costs.

It is therefore an object of the invention to provide a stabilizer arrangement of the initially mentioned type which permits a play-free transmission of the torsional moment in the torsion bar while the clutch is connected and which can be shifted by way of an operating device which has to apply lower driving or operating forces in comparison to the prior art.

This object is achieved by way of a stabilizer arrangement for a motor vehicle in which the form closure elements of the first clutch element or the second clutch element form engaging elements movably linked thereto, and in which, for separation of the clutch, the engaging elements are disposed to be movable independently of one another and are displaceable independently of one another by the operating device. Additional characteristics of the invention are reflected in dependent claims.

Principal advantages achieved by the invention include disengagement of the engaging elements almost without force, and therefore also with a much lower operating force, from the form closure elements during separating of the clutch. This, in addition, results in a low wear on the clutch. Furthermore, the operating device for the form closure elements or engaging elements may have a compact construction because no high operating forces have to be applied. These advantages are achieved, in each case, by disengaging the engaging element from the form closure element which at that moment experiences no circumferential force generated during the rotation of the torsion bar. The clutch is therefore always opened without any load.

If several form closure elements are arranged in a row, with several form closure elements forming one form closure section, respectively, and, in each case, interacting with the engaging elements, then, when the clutch is separated, a reengaging of the two clutch elements can even take place when the two clutch elements are still rotated relative to one another.

In a particularly preferable embodiment, each of two form closure sections, together with the engaging elements assigned to them, forms one respective rotation blocking device. Two rotation blocking devices form a blocking device pair. However, each of the rotation blocking devices causes rotational blocking in only one relative rotating direction between the clutch elements. In the other relative rotating direction, each rotation blocking device is free running. The rotation blocking direction and the free running direction of one rotation blocking device are in each case oriented opposite to the rotational blocking direction and the free running direction of the other rotation blocking device. By means of this, in a particularly advantageous manner, restoring of the starting position of the two clutch elements, rotated relative to one another, is permitted.

In a preferred embodiment, the engaging elements are maintained in engagement with the form closure elements, even when the operating device malfunctions, so that a so-called fail-safe function is provided.

In order to be able to displace the engaging elements independently of one another by way of the operating device without a high operating force, a prestressable operating spring is provided for the engaging elements. Although both engaging elements are acted upon by way of the spring force when the operating spring is prestressed, the engaging element, which at this moment experiences no circumferential force, is disengaged from the form closure elements so that movement of this engaging element takes place easily. In this case, the operating spring is prestressed such that the spring prestressing force provided is greater than the force of the holding spring and smaller than the force to be applied which would be necessary for swivelling an engaging element subjected to circumferential force. When prestressing of the operating spring is reduced again, the holding springs will bring the engaging elements back into engagement with the form closure element, and the clutch is closed again. Instead of indirect operation of the engaging elements by way of the operating spring by means of only one operating device, several operating devices which can be controlled independently of one another may be provided. In this case, one operating device can be assigned to each engaging element.

According to one aspect of the invention, prestressing of the operating springs takes place by way of the operating device, which may comprise an electric motor drive and a shifting element, so that the operating device is cost-effective and, in addition, can be integrated into the clutch in a compact construction.

In one particularly preferred embodiment, the form closure sections are implemented by toothing sections with several teeth situated behind one another. These teeth form the form closure elements of the first clutch element. The engaging elements of the second clutch element are constructed as detent pawls which are disposed to be movable relative to the respective toothing section and have at least one detent. While its size is small or the space requirement for swivelling the detent pawls out is low, this embodiment permits a good torque transmission between the two clutch elements.

Free running in one relative rotating direction and rotational blocking in the other relative rotating direction as mentioned above are achieved in a simple manner by way of the flank shape of the teeth and the detent. The flank shape is constructed to be self-locking in the rotation blocking direction and, in the free running direction, has a contour which promotes displacement movement of the detent pawl, which displacement movement causes disengagement of the detents from the toothing sections. During relative rotation between the first and second clutch elements in the free running direction, the corresponding detent pawl is lifted by the flank shape over the individual teeth. In the other rotating direction, the detent pawl is held on the respective tooth, whereby torque transmission between the two clutch elements can take place in this rotating direction.

It was found to be particularly advantageous for the toothing sections to be constructed as respective saw toothings in which each tooth has two flanks of different steepnesses. The two toothing sections of a rotation blocking device are in this case oriented in opposite directions so that the free running or self-locking mentioned above is obtained by way of the saw tooth shape.

In the following, the invention will be explained in detail with reference to embodiments shown in the drawing.

DETAILED DESCRIPTION OF THE INVENTION

Figures 1A, 1B:
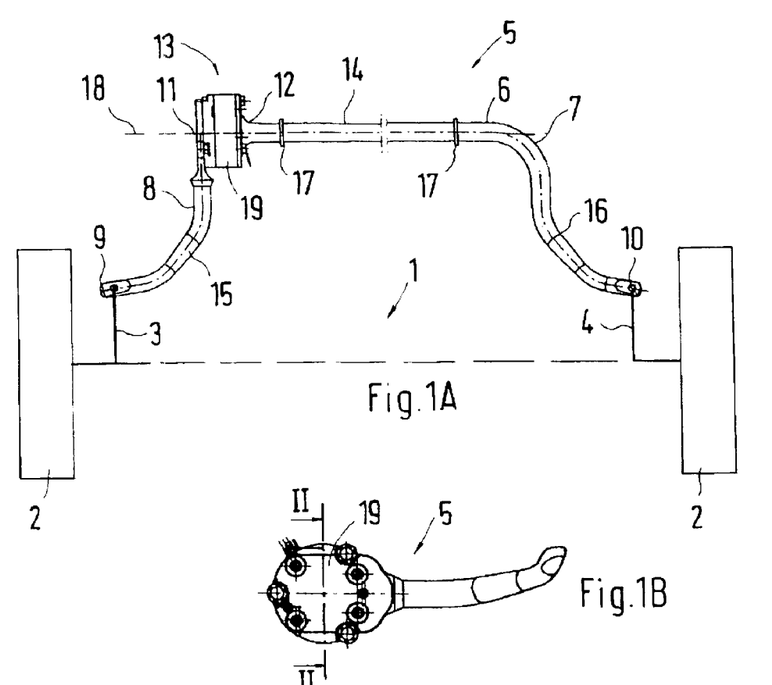
FIG. 1A is a view of a stabilizer arrangement on a wheel axle comprising two wheels.
FIG. 1B is a lateral view of the stabilizer arrangement according to FIG. 1A.

FIG. 1A illustrates a wheel axle 1 having two wheels 2 which are linked to only schematically illustrated wheel suspensions 3 and 4. A stabilizer arrangement 5 which has a two-part torsion bar 6 with two bar parts 7 and 8 is arranged essentially parallel to the wheel axle 1. The first extreme ends 9 and 10 of the bar parts 7 and 8 are respectively connected with the respective wheel suspension 3 and 4. The second, mutually facing ends 11 and 12 of the bar parts 7 and 8 can be form-lockingly connected with one another by way of a clutch for transmitting a torsion moment or can be separated from one another when no moment transmission is to take place. The essentially U-shaped torsion bar 6 has a base 14 as well as legs 15 and 16 originating from the base 14. Leg ends form the first ends 9 and 10 of the bar parts 7 and 8. The base 14 also can be called a rear region in which the clutch 13 is situated. Purely as an example, the clutch is arranged here in the transition area between the base 14 and the leg 15, but the clutch 13 can be provided at any point in the rear region.

In addition, the stabilizer arrangement 5 is connected with the body of a motor vehicle which is not shown here. In particular, the stabilizer arrangement is fastened to the body by way of bearings 17 applied to the base 14. The bearings 17 permit a rotation about the rear axis 18 of the torsion bar 6.

Figure 2:
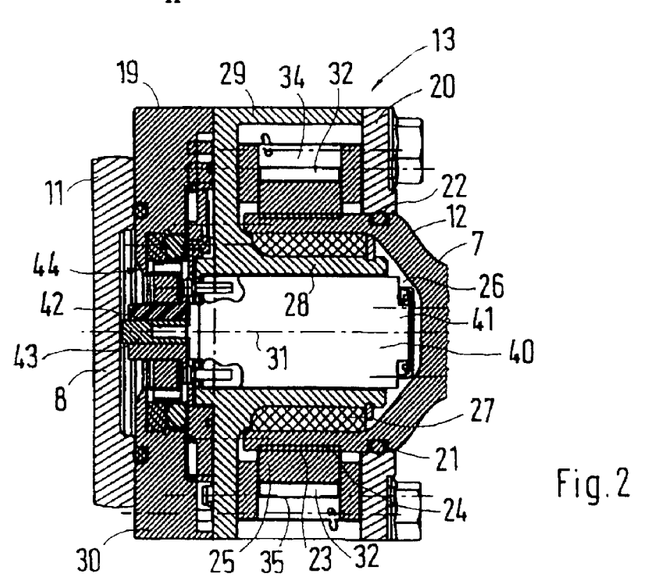
FIG. 2 is a sectional view of a first embodiment of a clutch of the stabilizer arrangement along line II—II in FIG. 1B.

FIG. 1B is a lateral view of a clutch housing 19 of the clutch 13. As illustrated in FIG. 2, the bar part 8 is non-rotatably connected by way of its end 11 with the clutch housing 19. The other bar part 7 reaches by way of its end 12 through an opening 21 provided in the clutch housing cover 20 and is sealed off with respect to this opening 21 by way of a surrounding seal 22.

Figure 3:
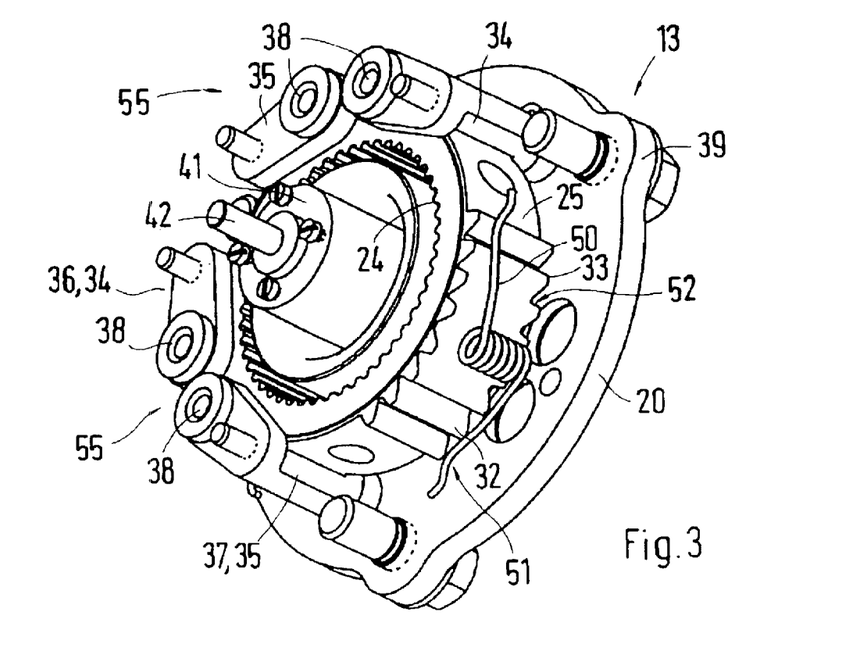
FIGS. 3 and 4 are respective perspective views of the clutch device without a clutch housing.

By way of FIGS. 2 to 4, the clutch 13 form-lockingly connecting or separating the two bar ends 11 and 12 will be explained in detail. The bar part 7 reaches by way of its end 12 through the cover 20 and, on a region situated inside the housing 19, has an external toothing 23 which engages in an internal toothing 24 on a first clutch element 25 of the clutch 13. On its end 12, the bar part 7 also has a central axial recess 26 in which a bearing 27, particularly a slide bearing, is arranged. The bearing is supported on a tube-shaped flange 28 which is connected with a housing pot 29 of the clutch housing 19. The housing pot 29 is fixedly connected with a receiving plate 30 of the clutch housing 19 to which the second end 11 of the bar part 8 is fastened. By way of the bearing 27, the second end 12 of the bar part 7 is thereby rotationally uncoupled from the end 11 of the bar part 8, so that these two bar parts can be rotated relative to one another about an axis of rotation 31 when the clutch 13 is separated, as will be explained below.

For torque transmission from the bar part 7 to the bar part 8 or vice versa, the first clutch element 25 non-rotatably connected with the bar part 7 has at least two form closure elements 32 and 33 which are arranged on the circumferential wall situated opposite the internal toothing 24 and which interact with second form closure elements 34 and 35. The second form closure elements are constructed as engaging elements 36 and 37 displaceable relative to the first form closure elements 32, 33 and are radially swivellable about swivelling axes 38 disposed on the housing pot 29 and/or on the cover 20. The clutch housing and the second form closure elements 34 and 35 thereby form a second clutch element 39 of the clutch 13, the engaging elements being movably linked to the second clutch element 39. When the engaging elements 36 and 37 engage with the form closure elements 32 and 33 assigned to them, the clutch 13 is closed. Torque transmission from the bar part 7 can therefore take place by way of the first clutch element 25 with its form closure elements 32 and 33 and by way of the second clutch element 39 with its form closure elements 34, 35 and its clutch housing 19 to the bar part 8 and vice versa.

For separating the clutch 13, that is, for disengaging the first and second form closure elements 32, 33 and 34, 35, an operating device 40 is provided. It swivels the second form closure elements 34 and 35 radially to the outside. The operating device 40 has a drive which drives a shifting element of the operating device 40 which moves the engaging elements 36 and 37 independently of one another. The drive is formed, for example, by an electric driving motor with a motor axis 42 which operates by way of a pinion 43 and a shifting gate 44 which forms the shifting element and which is constructed as a rotatably disposed ring 45 driven by way of the motor 41. The shifting gate 44 itself can be driven by way of a planetary transmission 46 (FIGS. 5 and 7) which has at least one planet gear 47 meshing with a ring gear 48. The ring gear 48 and the ring 45 may be constructed in one piece. The pinion 43 can form the sun gear of the planetary transmission 46. In the shifting gate 44, operating springs 49 are inserted in corresponding guiding recesses, which operating springs 49 are constructed as leg springs and are prestressed during a rotation about the axis of rotation 31 of the shifting gate 44 and thus admit a radially outward acting prestressing force to the engaging elements 36 and 37, whereby the engaging elements 36 and 37 can be disengaged from the first form closure elements 32 and 33. The spring forces applied by the prestressed operating springs 49 are greater than the holding forces of the holding springs 50 acting upon the engaging elements 36 and 37, which holding springs 50 force the engaging elements in the direction of the axis of rotation 31, thus radially toward the inside. As illustrated in FIGS. 3 and 4, the holding springs may be constructed as leg springs or—as illustrated in FIG. 5—as leaf springs bent in an m-shape. Since each of the engaging elements 36 and 37 is movably independently of the other, is disposed on a separate swivelling axis, and can be displaced independently of the other by way of the operating device 40, when the clutch 13 is to be separated, only the engaging element 36 or 37 is swivelled, experiencing no circumferential force UK (FIG. 6) which is generated by a torque introduced into one of the bar parts 7 or 8. Because the engaging elements 36 and 37 are not driven directly by way of the electric motor 41 and uncoupling occurs by way of the operating springs 49, the operating spring force provided by the operating springs 49 will swivel only the engaging element 36 or 37 radially toward the outside, which—as mentioned above—will experience no circumferential force UK.

Figure 6:
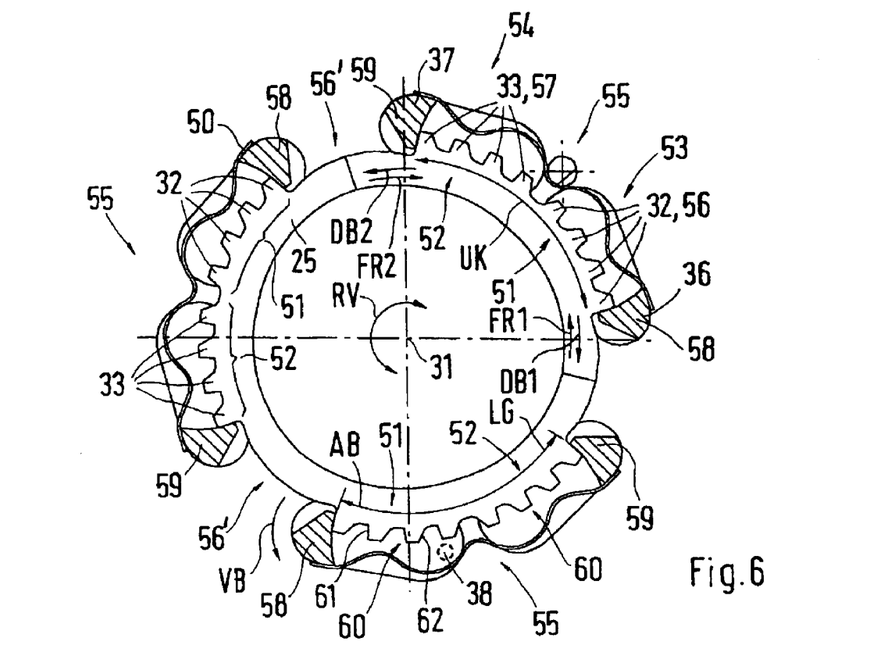
FIGS. 6 to 9 are views of clutch elements of the clutch in different clutch positions.
Figure 7:
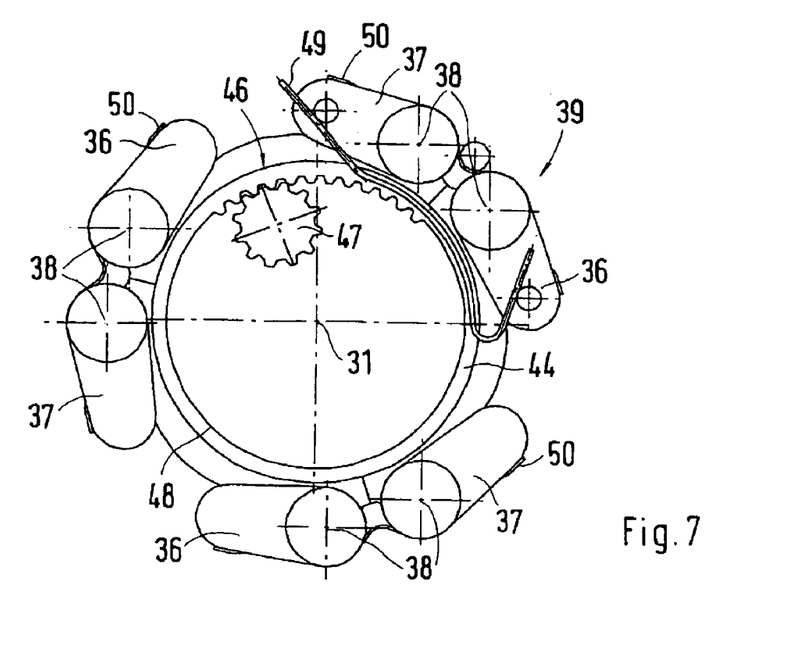

FIG. 6 illustrates that the first clutch element 25 has at least two form closure sections 51 and 52 with several form closure elements 32 and 33 respectively arranged in series in the circumferential direction of the first clutch element 25, which form closure elements 32 and 33 respectively interact with the engaging elements 36 and 37 arranged at the second clutch element 39. Each of two form closure sections 51 and 52, together with the engaging elements 36 and 37 assigned to them, represents a rotation blocking device 53 and 54, which together represent a blocking device pair 55. As a result of the contour of the first and second form closure elements 32 to 35, each rotation blocking device 53 and 54 respectively acts only in one relative rotating direction RV as a rotation blocking device; in the other relative rotating direction RV, each rotation blocking device is free running. Free running is initiated since, as a result of the corresponding contour of the form closure elements 32 to 35, during a relative rotation between the first clutch element and the second clutch element 25, 39, the engaging elements 36 and 37 are forced radially toward the outside and, during a further relative rotation, can engage again between the two following form closure elements 32 and 33. When torque is applied in the opposite direction, these engaging elements 36 and 37 act as holding devices and thus prevent relative rotation of the two clutch elements 25 and 39. Accordingly, the rotation blocking device 53 has a free running ability in the free running direction FR1 and a rotational blocking ability in the rotation blocking direction DB1. The free running direction FR2 and the rotation blocking direction DB2 of the rotation blocking device 54 are oriented in opposite directions for this purpose.

On the ring-shaped clutch element 25, the form closure sections 51 and 52—viewed in the circumferential direction—are arranged behind one another, and the engaging elements 36 and 37—also viewed in the circumferential direction—are arranged in series and at a distance AB with respect to one another. This distance AB corresponds to the length LG of the two form closure sections 51 and 52 of a blocking device pair 55. Two form closure sections 51 and 52 of a blocking device pair 55 are, in addition, arranged at a distance from the adjacent blocking device pair 55 with its form closure sections 51 and 52. One form-locking-free section 56' is constructed between two form closure sections of two adjacent blocking device pairs 55.

Each form closure section 51 and 52 is implemented by one toothing section with, in each case, several teeth 56 and 57 situated behind one another, viewed in the circumferential direction of the first clutch element 25. These teeth form the form closure elements 32 and 33 of the first clutch element 25. In addition, each engaging element 36, 37 of the second clutch element is constructed as a detent pawl which is movably disposed relative to the respective toothing section and has at least one detent 58, 59. As a result of the flank shape of the teeth 56 and 57 and of the detents 58 and 59, a self-locking effect is created in rotation blocking directions DB1 and DB2 respectively. In contrast, in the free running direction FR1 and FR2, respectively, the flank shape of the teeth 56, 57 and of the detent 58, 59 is selected such that a radially outward directed displacement movement VB of the engaging elements 36 and 37 respectively is promoted or initiated. In order to obtain self-locking in the rotation blocking directions DB1 and DB2 and free running in the free running direction FR1 and FR2, each toothing section, and thus each of the form closure sections 51 and 52, may be constructed as a saw toothing 60, in which case the saw toothing 60 of one toothing section of the one rotation blocking device 53 is oriented in the opposite direction to the saw toothing 60 of the other toothing section of the other rotation blocking device 54 of a blocking device pair 55. The saw toothing is characterized by a flank shape in which the flank 61 has a significantly steeper construction than the other flank 62 of a tooth 56, 57. If the corresponding detent pawl comes in contact with the steeper flank section 61, self-locking will be active. However, if the detent 58 comes in contact with the less steep flank section 62, the above-mentioned outward-directed displacement movement VB is promoted or initiated.

In the following, by way of FIGS. 6 to 9, a separation or reconnection of the clutch 13 will be described in detail. FIG. 6 shows the coupled condition of the clutch 13, in which torque transmission is possible from the one bar part 7 to the other bar part 8 and vice-versa. Starting from this basic position of the clutch 13 illustrated in FIG. 6, the engaging elements 36 and 37 respectively engage, as viewed in the rotation blocking direction DB1 and DB2 respectively, with the first tooth 56 and 57 respectively of the corresponding form closure section 51 and 52 respectively. The engaging elements 36 and 37 are held in this engaged position by the holding springs 50. In this case, the detents 58, 59 interact with the flanks 61, of which the detents 58, 59, when loaded, that is, when a circumferential force UK is introduced, cannot slide off the respective teeth 56 and 57 but are held thereon. According to whether, for example, by way of the bar part 7, a torque is applied clockwise (corresponding to the rotation blocking direction DB1) or in the opposite direction thereto (corresponds to the rotation direction DB2), one of the two detents 58 or 59 is without a circumferential force UK and the other detent 59 or 58 is acted upon by the circumferential force UK. As a result, the two clutch elements 25 and 39 are engaged without play in both relative rotating directions RV.

Figure 8:
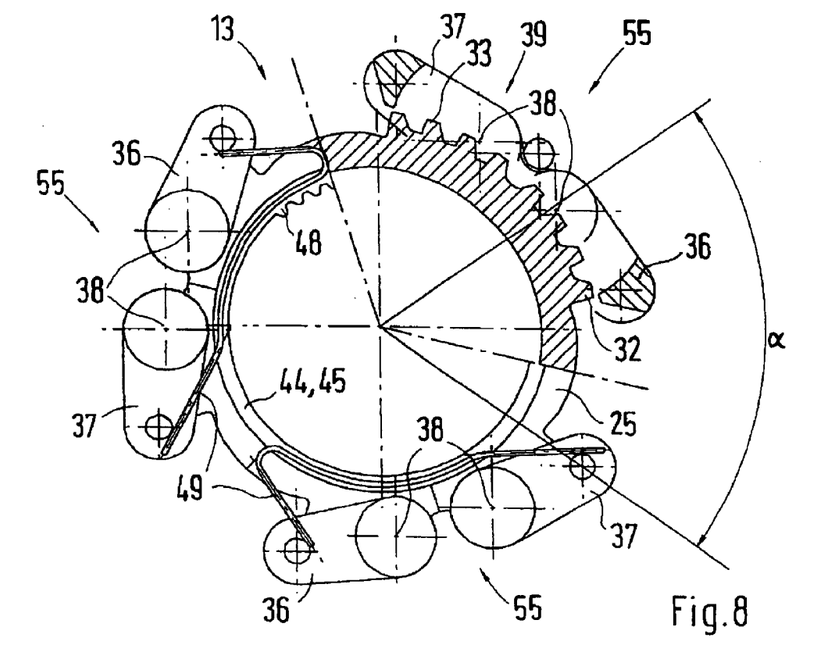
Figure 9:
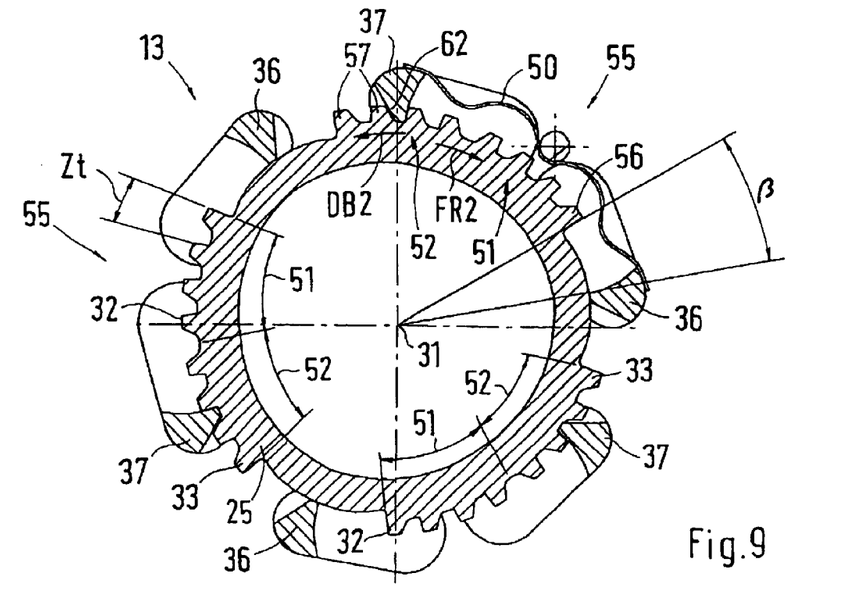

For uncoupling or separating of the clutch 13, for example, a driver of the motor vehicle can operate an electrical switch in the vehicle interior so that the electric motor 41 is controlled. The electric motor acts upon the planetary transmission 46, whereby the shifting gate 44 is rotated and the operating springs 49 are prestressed. The engaging element 36 or 37, which is at this point experiencing no circumferential force UK, is moved radially to the outside (corresponds to displacing movement VB) by the prestressing of the operating springs 49 and is thus disengaged from the respective form closure element 32 or 33. When the direction of the circumferential force UK is reversed, the second engaging element 37 or 36 also becomes load-free and can also be swivelled outward by way of the prestressed operating spring 49. Thus, the clutch 13 is separated and the two bar parts 7 and 8, or rather the first and second clutch elements 25 and 39, can be rotated relative to one another, as indicated by the relative rotating direction RV. When both engaging elements 36 and 37 are swivelled, as indicated in FIG. 8, the operating springs 49 remain prestressed, whereby the engaging elements 36 and 37 remain in the illustrated position and cannot interact with the toothing sections on the first clutch element 25. By way of a clearance angle α, which may be selected as a function of the vehicle and here amounts to, for example, +/−35°, the two clutch elements 25 and 39 can now be rotated relative to one another.

When the clutch 13 is to be engaged again, and the two clutch elements 25 and 39 are thus reconnected with one another for the purpose of torque transmission, the electric motor 41 is controlled in the opposite direction, so that the shifting gate 44 is rotated back into the starting position (FIG. 7), whereby prestressing of the operating springs 49 is taken back. The reengaging of the clutch 13 can be initiated as a function of the driving speed or manually by the driver of the motor vehicle. As a result of the taking-back of the prestressing of the operating springs 49, the engaging elements 36 and 37 are swivelled back by way of the holding springs 50 against the displacing movement VB and thus come to rest on the circumference of the first clutch element 25. At least one of the engaging elements 36 (FIG. 9) engages in the form closure section 52 assigned to it, whereby the rotational blocking is active in the rotational blocking direction DB2 and only a relative rotation RV of the first and of the second clutch element 25 and 39 is possible in the free running direction FR2. When a torque is introduced in the free running direction FR2, for example, by way of the bar part 7, the engaging element 36 is lifted out by the tooth flank shape 62 and reengages between the next two teeth 57. During another introduction of the torque in the free running direction FR2, this process is repeated until the engaging element 36 engages with the first tooth 57 of its form closure section 52. Simultaneously, the engaging element 37 has placed itself on the first tooth 56 of the form closure section 51, so that the basic condition of the two clutch elements 25 and 39 with respect to one another illustrated in FIG. 6 is reestablished. The two form closure sections 51 and 52 are now situated between the two engaging elements 36 and 37; the clutch 13 is therefore completely engaged; and a relative rotation RV of the two clutch elements with respect to one another is prevented. Thus, when, during the reengagement of the clutch 13, a torque is introduced in the corresponding free running direction FR1 or FR2, the corresponding engaging element 36 or 37 is caused to carry out the displacing movement VB and thereby comes to rest between the two next teeth 56 and 27 and engages there. In this case, the maximal clearance angle β, while the clutch 13 is not yet fully engaged, is gradually reduced as a function of the tooth pitch Zt of the toothing sections. The mutual spacing of two adjacent tips of the teeth 56 and 57 respectively may amount to, for example, Zt=5°. A different tooth pitch Zt is also conceivable.

Figure 4:
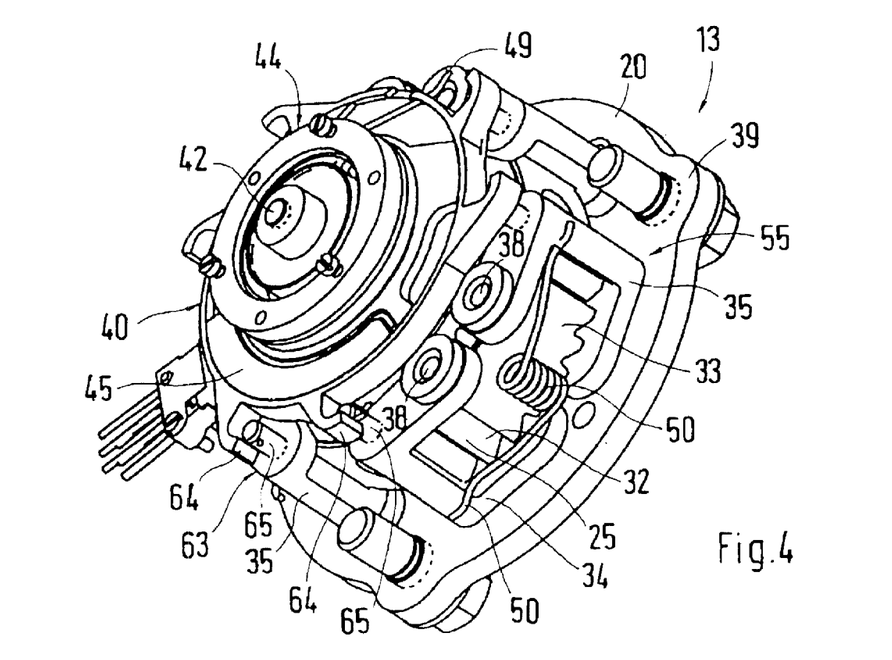
Figure 5:
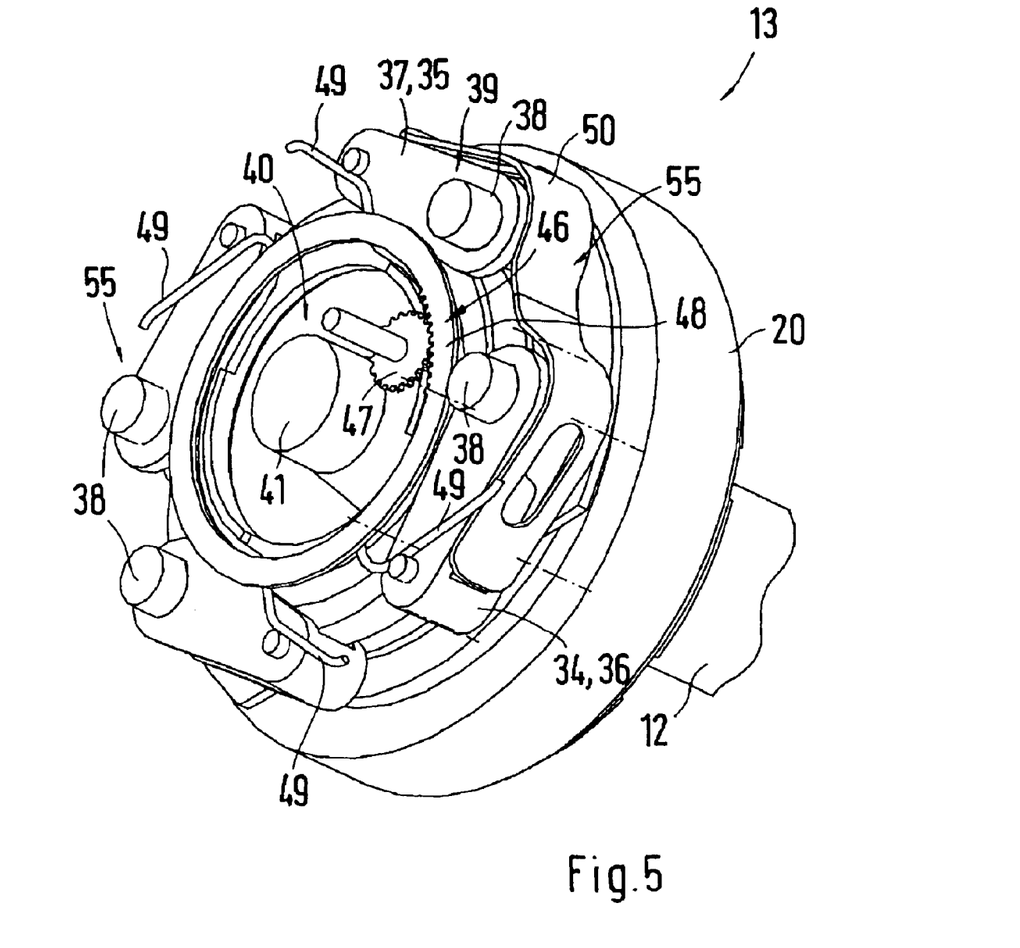
FIG. 5 is a perspective representation of a second embodiment of a clutch without a clutch housing.

FIG. 4 also shows a locking device 63 which may be provided on the rotatable shifting gate 44 and has hooks 64 which reach around the locking bolts 65 at the engaging elements 36 and 37 when the clutch 13 is closed. When the clutch 13 is to be separated, as a result of the rotation of the shifting gates 44, the locking bolts 65 are released, and the engaging elements 36 and 37 can be swivelled by way of the prestressed operating spring 49. In particular, the hooks 64, which are open on one side, are produced in one piece with the ring 45.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A stabilizer arrangement for a motor vehicle, comprising:
   a torsion bar with two bar parts, the bar parts having first ends which can each be connected with a wheel suspension of a wheel axle comprising two wheels,
   a clutch with a first clutch element and a second clutch element, the clutch form-lockingly connecting or separating two second ends of the bar parts situated adjacent to one another, each of said clutch elements, for a form-locking connection, having at least two form closure elements and, when the clutch is separated, being rotatable relative to one another, and
   an operating device for separation of the clutch,
   wherein the form closure elements of the first clutch element or the second clutch element form engaging elements movably linked thereto, and
   wherein, for separation of the clutch, the engaging elements are disposed to be movable independently of one another and are displaceable independently of one another by the operating device.

2. The stabilizer arrangement according to claim 1, wherein the first clutch element has at least two form closure sections with several form closure elements which, viewed in a circumferential direction of the first clutch element, are arranged in series and which interact with the engaging elements provided on the second clutch element.

3. The stabilizer arrangement according to claim 2, wherein the at least two form closure sections, together with the engaging elements assigned to them, form rotation blocking devices which represent a blocking device pair, wherein each rotation blocking device acts only in one relative rotating direction between the first and second clutch elements as a rotation blocking device and, in the other relative rotating direction, is free running, and wherein each of a rotation blocking direction and a free running direction of one rotation blocking device is oriented opposite to a rotation blocking direction and a free running direction of the other rotation blocking device.

4. The stabilizer arrangement according to claim 2, wherein, viewed in the circumferential direction of the first clutch element, the form closure sections are arranged in series and, viewed in the circumferential direction of the second clutch element, the engaging elements are situated in series and at a distance with respect to one another, this distance corresponding to a length of the form closure sections.

5. The stabilizer arrangement according to claim 3, wherein the clutch has several blocking device pairs which, viewed in circumferential directions of the first clutch element and the second clutch element respectively, are arranged in a distributed manner, wherein respectively adjacent blocking device pairs have a distance from one another, and wherein a form-closure-free section is constructed between two adjacent rotation blocking device pairs.

6. The stabilizer arrangement according to claim 2, wherein the engaging elements of the second clutch element are radially swivellably disposed relative to the form closure sections, and wherein the form closure sections are situated on a circumferential wall of the first clutch element.

7. The stabilizer arrangement according to claim 1, wherein the engaging elements are held in engagement with the form closure elements by the force of a holding spring.

8. The stabilizer arrangement according to claim 7, wherein each engaging element can be disengaged by way of a prestressable operating spring from a respective form closure element, and wherein the operating force provided by the prestressable operating spring is greater than the force of the holding spring.

9. The stabilizer arrangement according to claim 8, wherein the operating device comprises a drive and a shifting element driven thereby which moves the engaging elements independently of one another.

10. The stabilizer arrangement according to claim 8, wherein the operating device prestresses the operating spring.

11. The stabilizer arrangement according to claim 3, wherein each form closure section is implemented by a toothing section having several teeth situated behind one another, viewed in the circumferential direction of the first clutch element, which teeth form the form closure elements of the first clutch element, and wherein each engaging element of the second clutch element is constructed as a detent pawl which is movably disposed relative to the corresponding toothing section and has at least one detent.

12. The stabilizer arrangement according to claim 11, wherein a flank shape of the teeth and of the detent has a self-locking contour in the rotation blocking direction and, in the free running direction, has a contour promoting a displacing movement of the detent pawl, the displacing movement causing a disengagement of the at least one detent from the corresponding toothing section.

13. The stabilizer arrangement according to claim 11, wherein each toothing section is constructed as a saw toothing, the saw toothing of one toothing section of one rotation blocking device being oriented in a direction opposite to the saw toothing of the other toothing section of the other rotation blocking device of the blocking device pair.

14. The stabilizer arrangement according to claim 9, wherein said drive is an electric motor drive.

15. The stabilizer arrangement according to claim 12, wherein said displacing movement is a radially outward directed swivelling movement.

16. The stabilizer arrangement according to claim 3, wherein, viewed in the circumferential direction of the first clutch element, the form closure sections are arranged in series and, viewed in the circumferential direction of the second clutch element, the engaging elements are situated in series and at a distance with respect to one another, this distance corresponding to a length of the form closure sections.

17. The stabilizer arrangement according to claim 16, wherein the clutch has several blocking device pairs which, viewed in circumferential directions of the first clutch element and the second clutch element respectively, are arranged in a distributed manner, wherein respectively adjacent blocking device pairs have a distance from one another, and wherein a form-closure-free section is constructed between two adjacent rotation blocking device pairs.

18. The stabilizer arrangement according to claim 3, wherein the engaging elements of the second clutch element are radially swivellably disposed relative to the form closure sections, and wherein the form closure sections are situated on a circumferential wall of the first clutch element.

19. The stabilizer arrangement according to claim 4, wherein the engaging elements of the second clutch element are radially swivellably disposed relative to the form closure sections, and wherein the form closure sections are situated on a circumferential wall of the first clutch element.

20. The stabilizer arrangement according to claim 5, wherein the engaging elements of the second clutch element are radially swivellably disposed relative to the form closure sections, and wherein the form closure sections are situated on a circumferential wall of the first clutch element.

21. The stabilizer arrangement according to claim 9, wherein the operating device prestresses the operating spring.

22. The stabilizer arrangement according to claim 12, wherein each toothing section is constructed as a saw toothing, the saw toothing of one toothing section of one rotation blocking device being oriented in a direction opposite to the saw toothing of the other toothing section of the other rotation blocking device of the blocking device pair.

* * * * *